March 13, 1962
L. W. CONANT
3,024,977
APPARATUS FOR PRESENTING GRAPHED INFORMATION
FOR EVALUATION AND COMPARISON
Filed Oct. 29, 1957
2 Sheets-Sheet 1
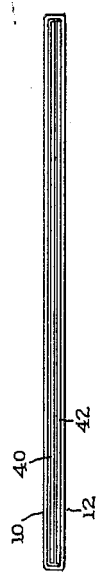
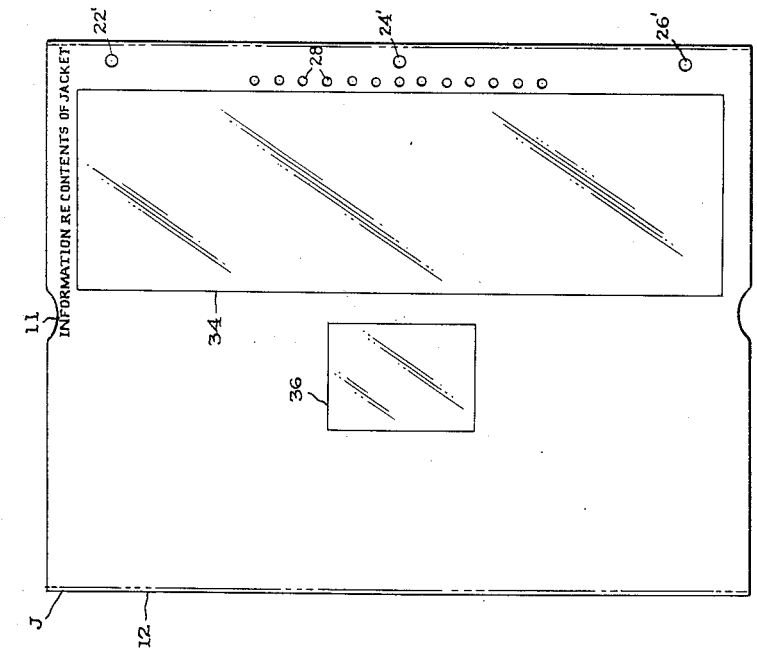
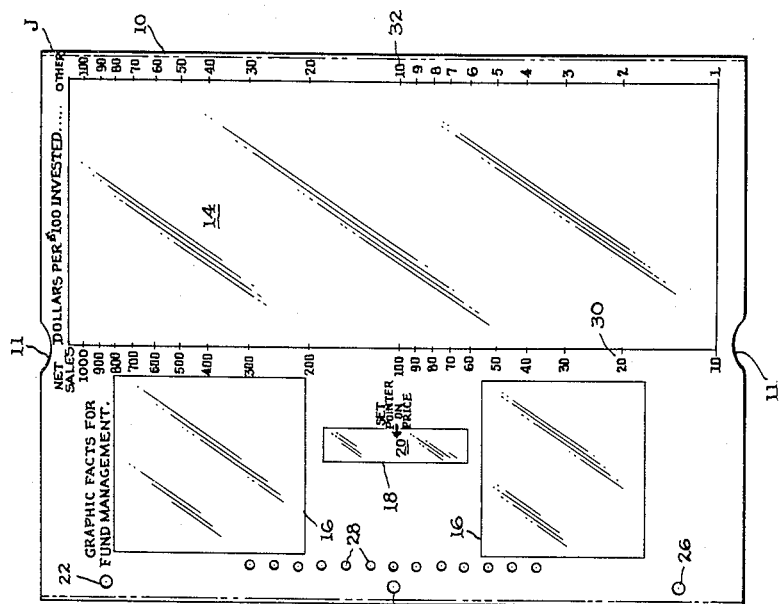
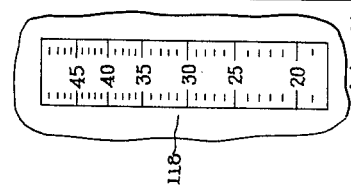
INVENTOR.
LAWRENCE W. CONANT
BY Lawrence I Field
ATTORNEY March 13, 1962

L. W. CONANT 3,024,977

APPARATUS FOR PRESENTING GRAPHED INFORMATION
FOR EVALUATION AND COMPARISON

Filed Oct. 29, 1957

INVENTOR.
LAWRENCE W. CONANT
BY
ATTORNEY

United States Patent Office 3,024,977
Patented Mar. 13, 1962

3,024,977
APPARATUS FOR PRESENTING GRAPHED INFORMATION FOR EVALUATION AND COMPARISON
Lawrence W. Conant, 3063 Ordway St. NW.,
Washington, D.C.
Filed Oct. 29, 1957, Ser. No. 693,122
2 Claims. (Cl. 235—61)

This invention relates to the art of integrating information and presenting this information graphically in a manner which permits its ready evaluation. More particularly it relates also to apparatus designed and constructed to facilitate both graphical and numerical presentation of the information, adjusted to reflect variations in the data between the time the graphical and numerical presentation is prepared and the time an evaluation is made by using the apparatus.

Briefly the device of the present invention comprises a sheet member bearing on its surface a graphical representation which may consist of one or more graph lines, and a second sheet member having window portions adapted to be placed over the graphical representations on the first sheet member, means to vary the relative orientation of the two sheets to reflect variations in the assumed values of a controlling variable utilized in the preparation of the graphical representation on said first member. At suitable locations on the second sheet member logarithmically divided ordinates are provided for purposes to be described. For convenience the second sheet member may constitute a portion of a jacket or envelope into which one or more sheet members bearing graphical representations may be independently inserted to any desired extent, according to an assumed value of a controlling variable.

A principal object of the invention is to integrate and hence permit more ready manipulation of information from two or more broad fields or sources, making possible comparisons and evaluations of various combinations of the total information available not heretofore achieved.

Another object of this invention is to provide a convenient means of presenting information of interest to prospective users in a manner in which it may be easily seen and understood.

Still another object of the invention is to provide a means whereby the information presented will reflect day to day variations in one significant variable without the necessity of replotting the information represented graphically.

A further object of the invention is to provide means for comparing data obtained from more than a single source, in a simple and direct manner which permits effective and immediate use of the evaluation derived from the comparison.

Other objects, features and advantages of the present invention will become more clearly apparent from the following detailed description of a preferred embodiment of the invention illustrated in the accompanying drawings in which:

FIGURE 1 is a view of the top or front portion of a jacket adapted to the revelation, gauging, evaluation and comparison of information appearing on either surface of a device to be inserted into the jacket.

FIGURE 2 is another view of the same jacket, in which the jacket has been turned over to show the arrangement of the bottom or rear portion of the jacket.

FIGURE 4 is an enlarged view of one feature of the device of FIGURE 3, illustrating the manner in which this feature is constructed.

FIGURE 7 is a sectional view of the device of FIGURE 6.

Figure 5:
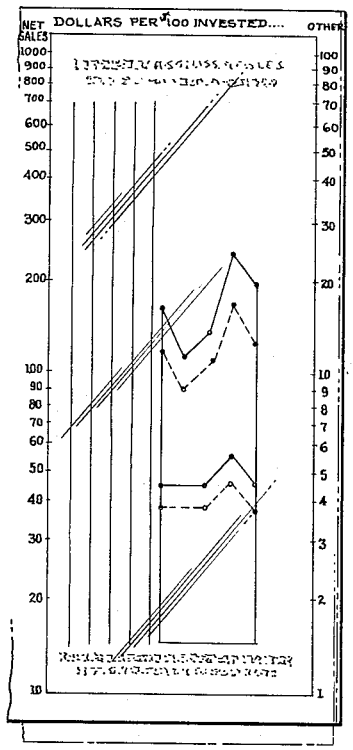
FIGURE 5 is a fragmentary view of the device of FIGURE 3 inserted in the jacket of FIGURES 1 and 2 and illustrates one manner of use of the device.

For purposes of illustration the present invention will be described as it applies to the evaluation of marketed securities such as common and preferred stocks, and will indicate how an investor can determine, for example, what each unit of capital he invests is actually purchasing. It will, however, be apparent that the invention may be applied to the integration, analysis and comparison of other data once these have been reduced to a graphical form, provided that the graphed information is uniformly affected by changes in a single factor employed in preparing the graphical representation. From the description which follows it will be seen that a device has been provided wherein information derived from a plurality of entirely separate sources, may be integrated through the use of such a factor as the selling price of the marketed security. In this case one source of information is the company or corporation being evaluated. This information may be published earnings, sales dividends or other data generated by the company. A second source of information is the market price which reflects an opinion of the general public. Still other information may be derived from reports generated by a government agency or by other entities not associated with the company chosen.

In the device described below it will be seen that the second source of information is included in every computation made in the embodiment chosen for purposes of illustration because the resulting answers are expressed in dollars per hundred dollars invested.

The jacket J shown in FIGURES 1 and 2 consists of a front portion 10 and a rear portion 12, each provided with a notch or recess 11 to facilitate the gripping of sheet material inserted between portions 10 and 12. The front portion is in the form of a sheet provided with a number of transparent portions hereinafter designated as windows 14, 16 and 18 through which information appearing on the device of FIGURE 3 may be observed when the several parts of the apparatus are assembled. As shown, a large window 14 is provided to expose chart 114 so that the graphed information may be readily examined. Preferably window 14 extends a substantial distance above and below chart 114, permitting the graphed information to be visible whether the chart is moved upward or downward through its usable range. Windows 16 are similarly proportioned, so that information on the insert shown in FIGURE 3 will be visible in all positions of the insert in the jacket when the insert and jacket are brought together. Located prominently on the front of the jacket is an indicator window 18 through which there will be observed scale 118 of FIGURE 3. A pointer or reference mark 20 divides the window into two approximately equal upper and lower portions. Other windows may be provided if found expedient to reveal any other information appearing on the insert shown in FIGURE 3. For example, in some instances a window could be provided for a title or name appearing on the insert. A series of equally spaced apertures 22, 24 and 26 are provided for mounting the jacket of FIGURE 1 in a conventional three ring binder. Obviously, other means may be provided for storing the jackets and their contents. There is also provided a positioning means in the jacket shown. These comprise a plurality of equally spaced perforations 28 closely adjacent to one margin of portions 10 and 12. Two logarithmic scales 30 and 32 disposed along opposite sides of window 14, complete the cover portion of the jacket. Scales 30 and 32 are not, as a rule, identical and may differ by any factor.

The rear portion of the jacket is provided with holes 22', 24' and 26' which are for the same purpose as holes 22, 24 and 26, and which therefore are located to mate with them when the front and rear portions of the jacket are brought together. Windows 34 and 36 or transparent areas in the rear portion of the jacket, provide access to other information appearing on the reverse side of the device of FIGURE 3.

Figure 3:
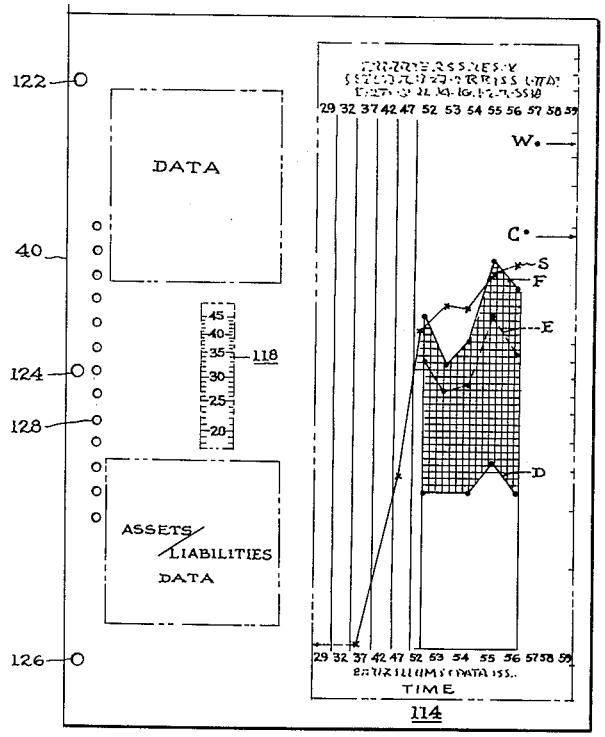
FIGURE 3 is a view of an exemplary information-bearing insert.
Figure 8:
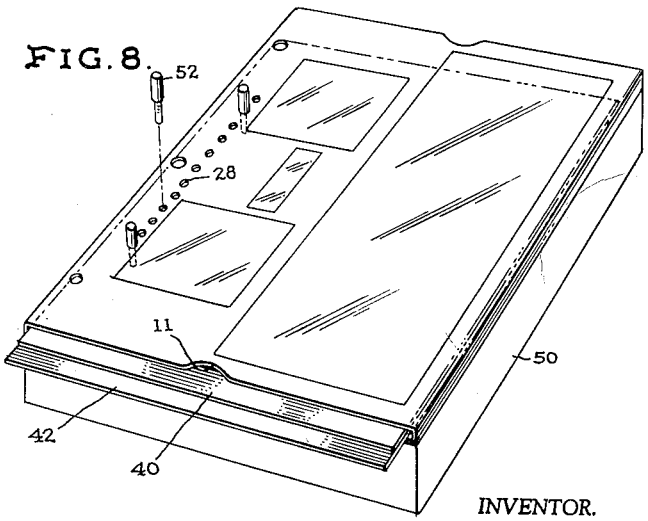
FIGURE 8 is an alternative means for supporting the device of FIGURE 3, in use.

The device of FIGURE 3 is an information bearing insert which is so designed that it can be inserted into the jacket of FIGURES 1 and 2 to be used either in conjunction with the jacket or with other comparable inserts, together with devices such as that shown in FIGURE 8. The device of FIGURE 3 consists of a sheet 40 adapted to be slidably inserted between the front and rear portions of the jacket formed when the front and rear portions are folded or otherwise brought into association with one another. It is preferably perforated to provide openings 122, 124, 126 and 128 to mate with the corresponding apertures in the jacket. As shown in FIGURE 3 sheet 40 carries on its surface several types of information. A major portion of the sheet is devoted to a graphical presentation in the form of lines or individual points comprising chart 114, which is adapted to be seen through window 14. The area constituting the lower left hand portion of sheet 40, visible through window 16 of front portion of the cover packet 10, is employed to present ratios not affected by the market price, and hence not read in conjunction with the scales or pointer on the front portion 10 of the jacket J, as for example the ratio of assets to liabilities or any other data considered of interest to persons employing the apparatus of this invention. On the reverse side of sheet 40 there may be printed additional information of interest in connection with the particular company for which the data of chart 114 has been derived. For example, a brief history of the company or a description of its products, services or plant facilities could be shown in areas in which it would not conflict with the information shown on the upper face of the sheet 40. Of course, it is necessary that the background area of chart 114 and scale 118 must be made transparent in order that use may be made of the device when several inserts are brought into the proper relationship. A second feature of sheet 40 is scale 118 which is adapted to be seen and read by means of window 18 and pointer 20, of front portion 10. Scale 118 is shown in greater detail in FIGURE 4.

FIGURE 4 is an enlarged view of scale 118. It is this scale which makes it possible to graphically marry the day-to-day and even the hour-by-hour market price of a security, for example, to data previously generated by a corporation in its annual or quarterly reports simply by moving the insert up or down within the jacket by discrete intervals.

The scale may be constructed quite simply without recourse to computation, or it may be derived by computation.

The simplest method of deriving scale 118 involves first the selection of a suitable price range for the security being evaluated. In the drawings a price of thirty dollars has been chosen as the median price or reference price for a security which has been sold for between seventeen and forty five dollars a share during the period graphed. A tracing is now made of the portion of logarithmic scale 30 embracing this numerical range. This fragment of scale 30 is positioned on sheet 40 with the reference or median price located more or less centrally in the space provided for scale 118. The tracing is then duplicated on sheet 40 as scale 118.

Another method of obtaining scale 118 involves the choice of an assumed selling price, e.g. the median price thirty dollars and the computation of the effect of specific changes in selling price, on the same value of the investment per hundred dollars invested. For instance if the price drops to twenty five dollars, then the value of assets or inventory purchased are thirty twenty-fifths ($^{30}/_{25}$) of the assets purchased at thirty dollars, or 120 as compared to 100 as a reference value. If the price is twenty the value of assets (or inventory) is thirty twentieths ($^{30}/_{20}$) or 150 and so on. Similar computations can be made over any desired range of selling prices.

The next step is to translate the computed data into the desired scale 118. This is done by taking a logarithmic scale corresponding precisely with the one used in constructing the scales on the jacket; reversing this scale so that it is used upside down; and then marking on the scale being constructed on the insert distances corresponding to the scale readings computed in step 2, above. For example, the price of 30 is placed exactly opposite 100 on the logarithmic scale; then a mark corresponding exactly to 120 on the logarithmic scale is made on the insert scale 118, and is identified as "25"; and a mark corresponding exactly to 150 on the logarithmic scale is made on the insert scale, and is identified as "20."(The whole numbers have been selected arbitrarily, merely for illustrative purposes). The location of "39" mark on the insert scale is made exactly opposite the reading of 76.92 (as nearly as this can be read) on the logarithmic scale; and so on, until scale 118 has been completed. It will be appreciated that still other methods of constructing scale 118 may be found to be applicable.

As shown, the intervals above the reference price gradually diminish in size, while those below the reference price increase in size. This is because the scale has been constructed so that equal percentage changes in price are reflected in equal displacements along the scale. As a result translation of the insert shown in FIGURE 3, when it is inserted to varying extents in the jacket will correspond at all times to a similar relative translation in the information appearing on the insert. Hence the scale is peculiarly adapted to cooperate with the semi-logarithmic plot of the graph of chart 114.

To more fully appreciate this it will be necessary to consider the manner in which the graph of chart 114 is plotted. Referring again to FIGURE 3, the horizontal coordinate is divided equally along the scale which represents time. The horizontal scale is divided into equal intervals representing one year or equal fractions of a year. As shown, it is also possible to select non-consecutive years with varying intervals of time omitted between the years selected. In the graph of chart 114, the numbers on this scale represent calendar years deemed significant for the company being analyzed. The vertical lines representing these years may either be shown or deleted, once the information is graphed, the choice being optional according to the ease of reading the graph. During plotting, the vertical scales used are the logarithmic scales 30 and 32 of cover portion 10. These scales may differ by a suitable factor such as 10 or 100 in order that the plotted information will appear in the same general area of the graph of chart 114. After the graphs have been plotted, any horizontal coordinates employed during the plotting are preferably eliminated from sheet 40 since they would tend to confuse and obscure the information obtained when the device is used in the intended manner. Scale 30, as shown at the left of window 14 is used to plot on chart 114 of sheet 40 a graph of net sales for a hypothetical XYZ company in dollars per hundred dollars invested. Scale 32 shown at the extreme right margin of FIGURE 1 also represents dollars per hundred dollars invested, the number of dollars at any height being, for example, one-tenth the number shown on scale 30. Scale 32 is used in plotting dividends, earnings or the like.

Reading from the bottom of the chart upward D represents the dividends paid by the XYZ company during the years selected. When the points plotted have been joined by a line the height of the line represents the specific amount of dividends paid in any year per hundred dollars invested and the slope of the line represents approximately the rate of change of payment of dividends. It will be noted that on the resulting graph D does not depict the actual dividends paid in dollars per share, but rather the dividends paid per hundred dollars invested at the assumed specific market price of thirty dollars. As the market price rises or falls, it is necessary to translate the graph of the chart vertically so that the dividends shown truly represent the dollars returned per hundred dollars invested. The manner in which this operation is performed will be explained below, in connection with FIGURE 5, it being sufficient to note here that the change may be made in a simple manner by shifting sheet 40 small amounts so as to either insert it further into the jacket or withdraw it slightly from the jacket.

Additional information may be plotted on chart 114. Curve E, for instance represents the earnings of the XYZ company, as dollars per hundred dollars invested, using the same assumed reference market price, curve F represents cash flow, meaning net earnings with depreciation and other similar book-entry items added back in, and curve S the net sales of the same company in dollars per hundred dollars of investment. Other data shown by way of illustration are points W and C representative of net working capital and cash and equivalent value of the XYZ company respectively. The cross hatched area shown between curves D and F is indicative of available funds. Each of these plots except for net sales is plotted with reference to logarithmic scale 32.

In order to use the chart in the jacket it is necessary to have a clearly established orientation or relative positioning indicative of either an assumed or an actual market price. This is done by inserting sheet 40 into the jacket and shifting it until the numbers on the scale 118 have been brought into view through the window 18 provided for the purpose. Thereafter, the chart is shifted slightly until pointer 20 points to and is aligned with the price, assumed or actual. In this position, the several graphed variables may then be read directly in terms of assumed price by use of scales 30 and 32 on the jacket.

FIGURE 5, shows the chart inserted in a first position (dash line) and the same chart after it has been inserted to a greater or lesser extent (full line) and therefore illustrates one of the aspects of the present invention, namely the effect of a change in the market price on the plotted information. As may be seen the slopes of both the dash line and the full line are the same and the only effect of varying the amount of insertion of sheet 40 into the jacket has been to alter the information expressed as dollars per hundred dollar unit of investment. Thus it is possible to position the chart in any desired manner in order to determine what the values would be for any assumed selling price and to thus evaluate the security in terms of a situation likely to exist in the future, as well as any situations which have historical interest because they existed in the past; as, for instance, the fact that the security was bought at a specific price.

Figure 6:
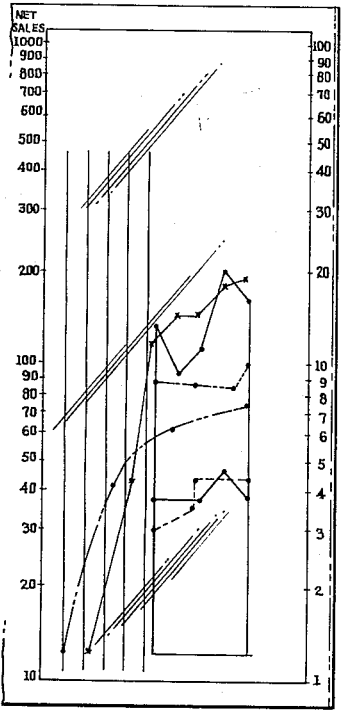
FIGURE 6 is a fragmentary view illustrating another manner of using the device of FIGURE 3 in which two such devices are inserted in the jacket of FIGURES 1 and 2.

FIGURES 6 to 8 illustrate another aspect of the invention. Specifically, as represented schematically in FIGURE 6, sheet 40, necessarily formed in this instance of transparent material, has been inserted into the jacket until pointer 20 coincides with the selling price on scale 118 and a second similar sheet 42 has been inserted to the extent necessary for the selling price of its security to fall directly in line with pointer 20. Only occasionally will both sheets be inserted an identical amount. As seen in the sectional view of FIGURE 7, two sheets 40 and 42 have been inserted between front portion 10 and rear portion 12 of the jacket, in order that the pertinent information for two independent companies may be readily compared. To insure that the sheets remain properly registered, the device shown in FIGURE 8 or other similar means may be employed.

In FIGURE 8 there is represented schematically a means whereby one or more sheets are temporarily secured to a holder 50 by means of pegs 52 which pass through the perforations 28. By these or similar means, the information on sheets 40 and 42 is presented in a convenient manner for quick and easy comparison. As the selling prices of the securities change, the relative positioning of charts 40 and 42 may also be changed correspondingly.

It will be obvious to others that instead of locating pointer 20 on the jacket, it could be inscribed permanently on holder 50, as could any of the other indicia shown on the jacket, and especially scales 30 and 32. By providing the holder with these means, the jacket may be dispensed with and this is particularly desirable when comparing a large number of securities, since it will then merely be necessary to drop the insert into position (using the proper perforation 28) onto pegs inserted on the holder and assemble a collection of information-carrying elements consisting solely of sheet 40 and comparable sheets for other companies. Holder 50 has been represented in FIGURE 8 as a pegboard. It will be apparent that other means may be provided for temporarily positioning one or more sheets to facilitate the evaluation of the information shown thereon. For example, holder 50 could take the form of a box containing a source of illumination.

Having now described my invention in accordance with the patent statutes, I claim:

1. An apparatus for comparing graphically and numerically amounts and rates of change of amounts of one or more dependent variables which are changed proportionately by changes in a controlling variable which comprises the following: a first information bearing sheet member whereon there is depicted a family of lines constituting a graphical representation plotted relative to linearily divided abscissae indicative of chronological dates past, present and future and logarithmically divided ordinates indicative of values of the dependent variables and a logarithmic scale parallel to the axis of ordinates on which the logarithmically divided calibrations represent values of the controlling variable; and a second sheet member including first and second window portions, said sheet members being disposed in mating relationship with said window portions respectively overlying those portions of said first sheet member bearing the graphical representation and said logarithmic scale; means for orienting the first member with reference to the second member corresponding with an assumed instantaneous, fixed absolute value of the controlling variable, said means comprising an index pointer on said second sheet member adjacent said second window overlying said logarithmic scale; at least one reference scale having logarithmically divided calibration on said second sheet member parallel to the axis of ordinates and adjacent said first window, permitting simultaneous evaluation of the information represented graphically, that is, the amounts and rates of change in the amounts of the several graphed dependent variables plotted on the first-named member in terms of the assumed value of the controlling variable, as determined by the relative orientation of said first sheet member and said second sheet member.

2. The apparatus of claim 1, including at least one additional sheet member structurally similar to the first sheet member wherein the graphed information presented is directed to a second subject under evaluation, said additional sheet member being concurrently positionable in mating relationship with said second sheet member, at least one of said first and additional sheet members being transparent, whereby the graphical representations on the first and additional sheet members may be directly compared after each of said members is oriented to correspond to the assumed fixed instantaneous absolute value of its respective controlling variable.

References Cited in the file of this patent

UNITED STATES PATENTS

| | | |
|---|---|---|
| 1,382,011 | O'Neill | June 21, 1921 |
| 1,454,104 | Caldwell | May 8, 1923 |
| 2,415,581 | Doub | Feb. 11, 1947 |
| 2,470,495 | Kohn | May 17, 1949 |
| 2,494,536 | Atwood | Jan. 17, 1950 |
| 2,512,387 | Sands | June 20, 1950 |
| 2,585,595 | Spencer | Feb. 12, 1952 |
| 2,614,751 | Heinz | Oct. 21, 1952 |
| 2,815,172 | Van Arsdale | Dec. 3, 1957 |